United States Patent [19]

Ohmori et al.

[11] Patent Number: 4,949,393
[45] Date of Patent: Aug. 14, 1990

[54] MOTOR ROTATION SPEED CONTROLLING APPARATUS

[75] Inventors: Koji Ohmori, Takasuki; Yutaka Nozaki, Muko; Hirofumi Endo, Nagaokakyo; Hidetoshi Matsumoto, Kyoto, all of Japan

[73] Assignee: Omron Tateisi Electronics Co., Kyoto, Japan

[21] Appl. No.: 144,985

[22] Filed: Jan. 19, 1988

[30] Foreign Application Priority Data

Jan. 20, 1987 [JP] Japan .................................. 62-11543

[51] Int. Cl.⁵ .............................................. H02P 5/00
[52] U.S. Cl. .................................... 388/815; 388/910; 388/915
[58] Field of Search ............... 318/125, 129, 130, 132, 318/134, 139, 345, 341, 809, 811, 815, 819, 821-823; 388/809-815, 816-824

[56] References Cited

U.S. PATENT DOCUMENTS

| | | | |
|---|---|---|---|
| 3,890,554 | 6/1975 | Yoshitake et al. | 318/341 |
| 4,034,274 | 7/1977 | Akima | 318/341 |
| 4,177,412 | 12/1979 | Minakuchi | 318/341 |
| 4,332,208 | 6/1982 | Watasue et al. | 318/341 |
| 4,424,470 | 1/1984 | Finch | 318/341 |
| 4,458,183 | 7/1984 | Neilson | 318/341 |

Primary Examiner—William M. Shoop, Jr.
Assistant Examiner—David Martin
Attorney, Agent, or Firm—Wegner & Bretschneider

[57] ABSTRACT

The present invention is directed to a motor rotation speed controlling apparatus including a comparator, a detecting circuit for detecting a feedback signal of a motor, a motor driving transistor, and a circuit for changing the level of a constant voltage fed to the comparator. The comparator compares a saw-tooth voltage with a constant voltage and outputs a signal which has a duty cycle corresponding to the result of the comparison. The motor driving transistor drives the motor in response to the output signal from the comparator. To change the duty cycle of the output signal from the comparator, a circuit is used that changes the level of the constant voltage in response to a feedback signal detected by the detecting circuit.

9 Claims, 4 Drawing Sheets

MOTOR ROTATION SPEED CONTROLLING APPARATUS

BACKGROUND OF THE INVENTION

This invention relates to a motor rotation speed controlling apparatus, and more particularly, to an improved motor rotation speed controlling apparatus which controls the rotation speed of a motor whose load changes frequently and which is employed in electric tools such as an electric screw driver, electric drill, or electric saw.

In a conventional motor rotation speed controlling apparatus, a feedback circuit is used that employs a tachometer to control the speed and torque of a motor, for example, a d.c. motor, during a load running of electric tools such as an electric drill. Such a conventional speed controlling apparatus, however, requires a motor current detecting circuit, a differential amplifier, and a tachometer to detect currents flowing through the motor and to measure the rotation speed thereof. Therefore, the conventional apparatus has the following disadvantages: it requires an increased number of electrical parts, it has a high cost, it involves a complicated circuit configuration, and it is difficult to change the characteristics of the motor.

SUMMARY OF THE INVENTION

It is, therefore, an object of this invention to provide a motor rotation speed controlling apparatus which has a simple circuit configuration and is inexpensive.

It is another object of this invention to provide a motor rotation speed controlling apparatus which permits the characteristics of the motor to be changed.

According to this invention, there is provided a motor rotation speed controlling apparatus having (1) means for generating a saw-tooth voltage, (2) setting means for setting a constant voltage, (3) comparison means for comparing the saw-tooth voltage with the constant voltage and for outputting a signal which has a duty cycle corresponding to the result of the comparison, (4) driving means for driving a motor in response to the signal from the comparison means, and (5) circuit means for changing the level of the constant voltages set by the setting means in response to a feedback signal of the motor.

BRIEF DESCRIPTION OF THE DRAWINGS

The above and other objects, advantages and features of this invention will be more fully understood when considered in conjunction with the following figures, of which.

DETAILED DESCRIPTION OF THE INVENTION

Figure 1:
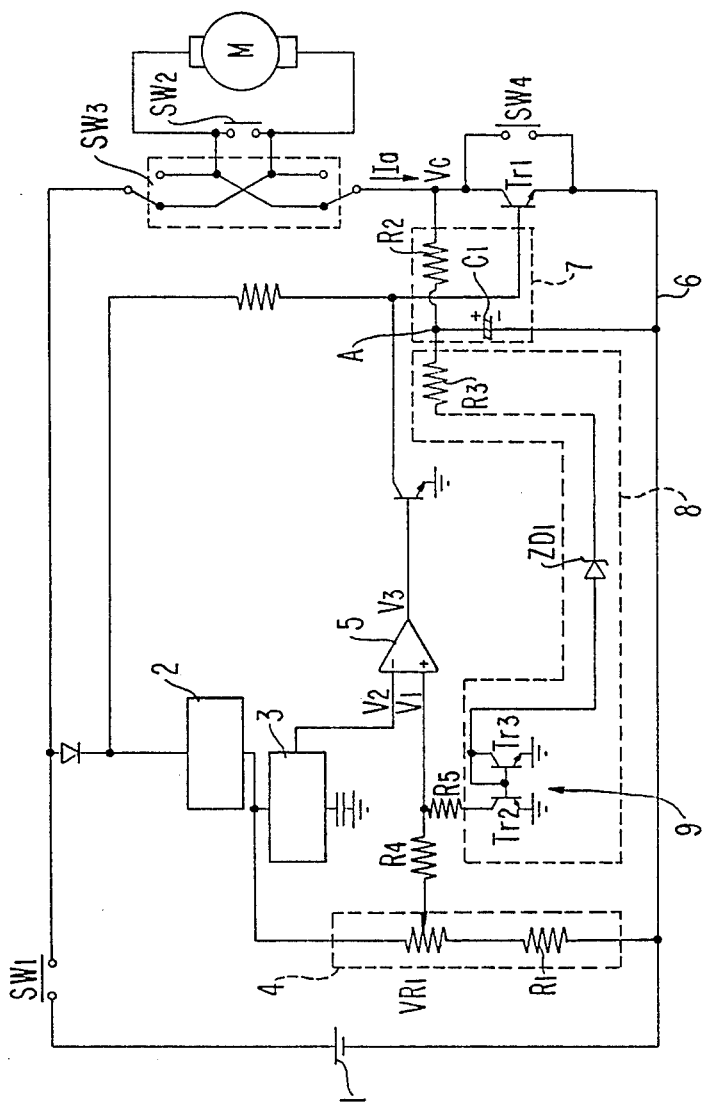
FIG. 1 is a schematic view of a first preferred embodiment of this invention.

FIG. 1 shows a circuit configuration of a motor rotation speed controlling apparatus according to a first embodiment of this invention.

When an operation lever, not shown, is pulled, a power supply switch SW1 is turned on to connect a power supply 1 to a constant voltage circuit 2. A constant voltage generated by constant voltage circuit 2 is fed to a saw-tooth voltage generator 3 and a motor speed setter 4. A saw-tooth voltage V2 (FIG. 2A) is fed into a comparator 5 via its inverting input terminal. Motor speed setter 4 includes a variable resistor VR1 and a resistor R1. Resistor VR1 and R1 divide the constant voltage feed from circuit 2 to generate a constant voltage V1 (FIG. 2A), which is fed into comparator 5 via a non-inverting terminal.

Variable resistor VR1 communicates with the above operating lever and changes the level of the constant voltage V1 which corresponds to a pulling degree, that is a stroke, of the lever. Comparator 5 compares the constant voltage V1 with the saw-tooth voltage V2 and outputs pulse signals to operate a motor driving power transistor Tr1.

Since the level of the voltage V1 is changed by the lever and the saw-tooth voltage V2 is invariable, the duty cycle of the pulse signals for operating motor driving transistor Tr1 changes. Therefore, a circuit current flowing through a main circuit of a d.c. motor M varies to change the motor speed and torque.

A braking contact SW2 is turned on to brake motor M when SW1 is turned off. A switch SW3 changes the rotation direction of motor M. And a short-circuiting switch SW4 is provided to short-circuit the transistor Tr1 when the operation lever is pulled to the full stroke. A collector voltage detector 7, which is connected to motor driving transistor Tr1, includes a collector voltage detecting resistor R2 and a smoothing capacitor C1. Detector 7 detects the changes in the collector voltage Vc and feeds them to a feedback quantity setter 8. Feedback variable setter 8 includes a feed back variable limiting resistor R3, a Zener diode ZD1 for determining a feedback starting time, and a pair of transistors Tr2 and Tr3 for converting voltages into currents. Transistors Tr2 and Tr3 provide a mirror circuit 9 and the output of transistor Tr2 is connected to variable resistor VR1 via resistors R4 and R5.

The operation of the circuit shown in FIG. 1 will be described hereinafter.

When a load is connected to motor M, the motor speed reduces. The circuit current Ia increases to reduce the back electromotive force of motor M. These factors cause the increase in the current Ia, the collector voltage Vc and the voltage at a connecting point A. When the voltage at the point A exceeds the breakdown voltage of diode ZD1, a current flows to turn on transistors Tr2 and Tr3. When transistor Tr2 is turned on, a current flows through resistor VRI, R4, and R5 to reduce the non-inverting input voltage V1. The reduced voltage V1 increases the duty cycle of the pulse signals outputted from comparator 5. Therefore, the conducting time of transistor Tr1 increases to speed the motor rotation.

Figure 2A:
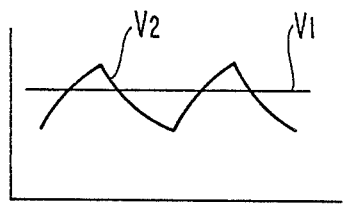
FIG. 2A shows a constant voltage and a saw-tooth voltage during a non-load running of the motor shown in FIG. 1.
Figure 2B:
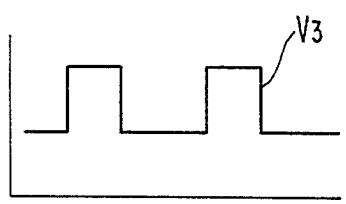
FIG. 2B is an output signal obtained by comparing the constant voltage with the saw-tooth voltage shown in FIG. 2A.
Figure 2C:
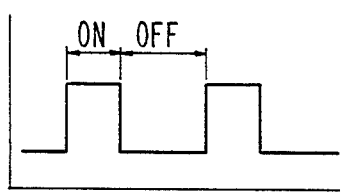
FIG. 2C is a pulse signal which is outputted from the motor driving transistor shown in FIG. 1 during the non-load running of the motor.

FIGS. 2A to 2C show waveforms during a non-load running of motor M. Comparator 5 compares the voltages V1 and V2 shown in FIG. 2A. Since there is no feedback signals and current mirror circuit 9 is at rest, the voltage V1 is relatively low and the duty cycle of the output signals from comparator 5 is small. Therefore, the output pulse signals from transistor Tr1 also have a relatively short duty cycle as shown in FIG. 2C.

Figure 3A:
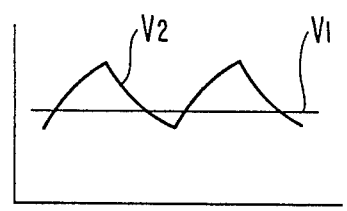
FIG. 3A shows a constant voltage and a saw-tooth voltage during a load running of the motor shown in FIG. 1.
Figure 3B:
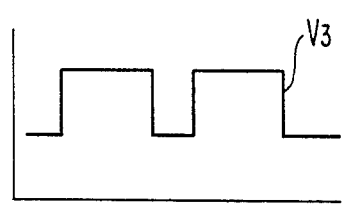
FIG. 3B is an output signal obtained by comparing the constant voltage with the saw-tooth voltage shown in FIG. 3A.
Figure 3C:
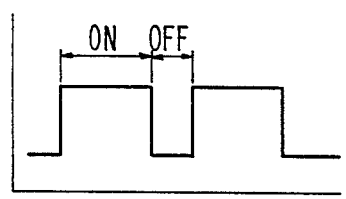
FIG. 3C is a pulse signal which is outputted from the motor driving transistor during the load running of the motor.

FIGS. 3A to 3C show waveforms during the load running of motor M. When motor M is under the load running, the circuit current Ia and collector voltage Vc increase to turn on transistor Tr2 of current mirror circuit 9. The conducted transistor Tr2 reduces the non-inverting input voltage V1 as shown in FIG. 3A. Therefore, the duty cycle of the output signals from comparator 5 increases to raise the conducting time of transistor Tr1, that is, the duty cycle of the output signals therefrom. The raised duty cycle of transistor Tr1 boosts the rotation speed of motor M. Changing the circuit constants of resistor R3 and Zener diode easily changes the feedback quantity and feedback starting time. Motor driving transistor Tr1 can be a FET or a MOSFET.

Figure 4:
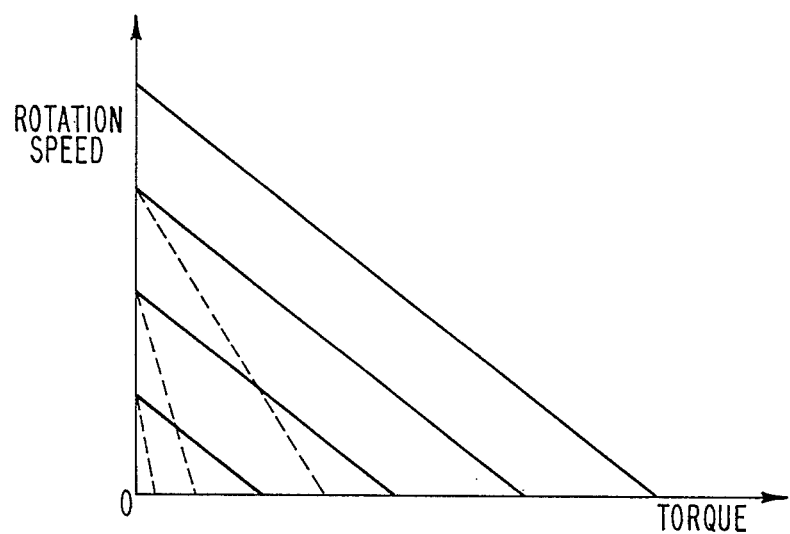
FIG. 4 shows motor rotation speed vs. motor torque characteristics.

FIG. 4 shows motor rotation speed vs. motor torque characteristics. Solid lines present the characteristics in the case where the apparatus includes the feedback function, while broken lines present the characteristics in the case where the apparatus does not include the function. FIG. 4 clearly reveals that the feedback function contributes to the increase in the motor torque.

Figure 5:
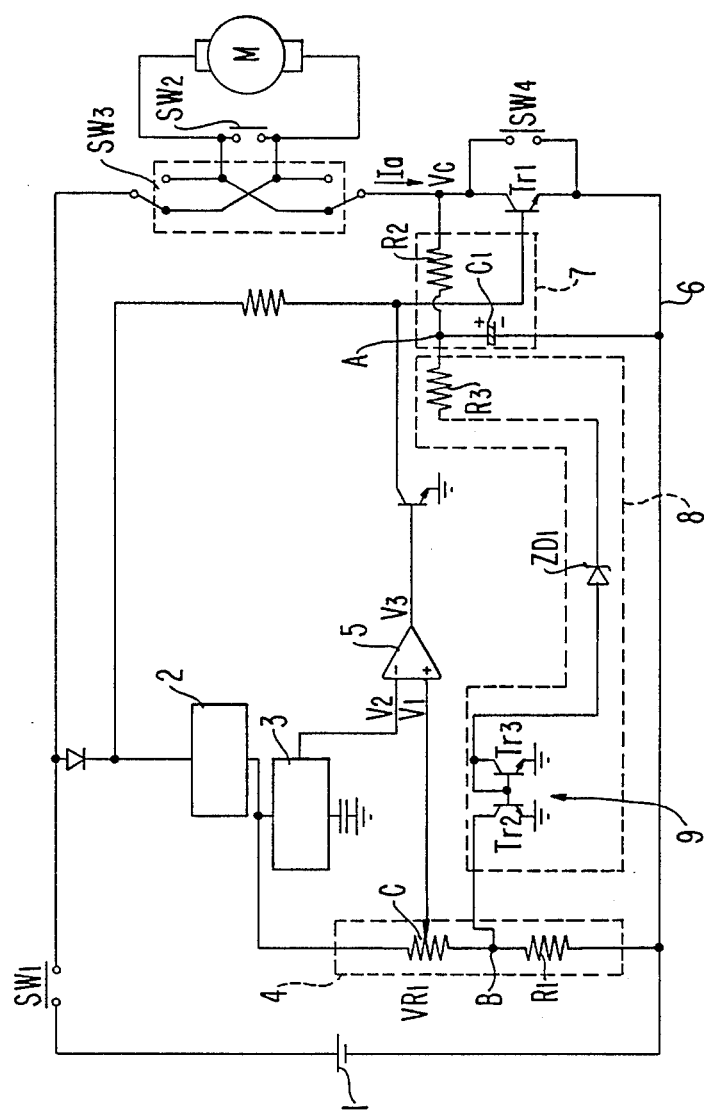
FIG. 5 is a schematic view of a second preferred embodiment of this invention.

FIG. 5 shows a motor rotation speed controlling apparatus according to a second embodiment of this invention.

In this embodiment, the output terminal of transistor Tr2 is connected to a point B where resistor VR1 and R1 are connected to each other. When transistor Tr2 is turned on, the voltage at point B is reduced. The voltage at a point C in resistor VR1 is also reduced to lower the non-inverting input voltage V1. Since the duty cycle of the output signals from comparator 5 increases, the conducting time of transistor Tr1 also increases to boost the rotation speed of motor M.

Since the operations of the other components in the apparatus are the same as those described in the first embodiment, they are not explained here.

The apparatus according to this invention is inexpensive because it does not require a motor current detector, a differential amplifier, and a motor speed detector, as used in the conventional devices.

In all the FIGS. 1 to 5, like numerals designate like or corresponding components. The above description and the accompanying drawings are merely illustrative of the application of the principles of the present invention and are not limiting. Numerous other arrangements which employ the principles of the invention and which fall within its spirits and scope may be readily devised by those skilled in the art. Accordingly, the invention is not limited by the foregoing description, but only by the appended claims.

We claim:

1. A motor rotation speed controlling apparatus comprising:

means for generating a saw-tooth voltage;
setting means for setting a constant voltage;
comparison means for comparing the saw-tooth voltage with the constant voltage and for outputting a signal which has a duty cycle corresponding to the result of the comparison;
driving means for providing a driving current to drive a motor in response to the signal from said comparison means, wherein said driving means comprises a transistor having a collector voltage; and
circuit means for changing the level of said constant voltage set by said setting means in response to a feedback signal of said motor, wherein said circuit means comprises means for detecting said collector voltage and means for converting said collector voltage into a current 2. The apparatus as in claim 1, wherein said setting means includes a variable resistor and a resistor connected to said variable resistor.

3. The apparatus as in claim 1, wherein said circuit means includes a Zener diode and a current mirror circuit connected to said Zener diode.

4. The apparatus as in claim 1, wherein said driving means includes a power transistor.

5. The apparatus as claimed in claim 1, wherein said means for detecting said collector voltage includes a detecting resistor for detecting a feedback signal and a smoothing capacitor connected to said detecting resistor.

6. A method for controlling the rotation of a motor, said method comprising:

generating a saw-tooth voltage;
setting a constant voltage;
comparing said saw-tooth voltage to said constant voltage and outputting a signal having a duty cycle corresponding to the result of the comparison;
driving a motor with a transistor in response to said signal;
generating a feedback signal by detecting a collector voltage of said transistor and converting said collector voltage into a current; and
changing the level of said constant voltage in response to said feedback signal from the motor, 7. A motor rotation speed controlling apparatus comprising:

means for generating a saw-toth voltage;
setting means for setting a constant voltage;
comparison means for comparing the saw-tooth voltage with the constant voltage and for outputting a signal which has a duty cycle corresponding to the result of the comparison;
driving means for providing a driving current to drive a motor in response to the signal from said comparison means, wherein said driving means comprises a transistor having a drain voltage; and
circuit means for changing the level of said constant voltage set by said setting means in response to a feedback signal of said motor, wherein said circuit means comprises means for detecting said drain voltage and means for converting said drain voltage into a current.

8. The apparatus as in claim 7, wherein said circuit means includes a Zener diode and a current mirror circuit connected to said Zener diode.

9. A method for controlling the rotation of a motor, said method comprising:

generating a saw-tooth voltage;

setting a constant voltage;
comparing said saw-tooth voltage to said constant voltage and outputting a signal having a duty cycle corresponding to the result of the comparison;
driving a motor with a transistor in response to said signal;
generating a feedback signal by detecting a drain voltage of said transistor and converting said drain voltage into a current; and
changing the level of said constant voltage in response to said feedback signal from the motor.

* * * * *